(12) United States Patent
Engels et al.

(10) Patent No.: US 9,947,442 B2
(45) Date of Patent: Apr. 17, 2018

(54) HIGH-VOLTAGE BUSHING AND HIGH-VOLTAGE INSTALLATION WITH THE BUSHING

(71) Applicant: SIEMENS AKTIENGESELLSCHAFT, Munich (DE)

(72) Inventors: Engelbert Engels, Cologne (DE); Achim Langens, Lohmar (DE); Christian Paul, Alfter (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/478,391

(22) Filed: Apr. 4, 2017

(65) Prior Publication Data
US 2017/0287601 A1 Oct. 5, 2017

(30) Foreign Application Priority Data
Apr. 4, 2016 (DE) .................. 10 2016 205 535

(51) Int. Cl.
| | | |
|---|---|---|
| H01B 17/26 | (2006.01) | |
| H01B 17/30 | (2006.01) | |
| H02G 3/08 | (2006.01) | |
| H01B 17/28 | (2006.01) | |
| H01B 17/50 | (2006.01) | |

(52) U.S. Cl.
CPC ......... *H01B 17/303* (2013.01); *H01B 17/265* (2013.01); *H01B 17/28* (2013.01); *H02G 3/083* (2013.01); *H01B 17/50* (2013.01)

(58) Field of Classification Search
CPC .. H02G 3/22; H02G 3/04; H02G 3/24; H02G 3/30; H02G 3/36; H02G 15/34; H02G 15/20; H02G 3/083; H01B 17/00; H01B 17/26; H01B 17/005; H01B 17/303; H01B 17/265; H01B 17/28; H01B 17/50;
(Continued)

(56) References Cited

U.S. PATENT DOCUMENTS 2,859,271 A * 11/1958 Johnsto ................. H01B 17/28
174/142
2,912,480 A * 11/1959 Johnston ............... H01B 17/28
174/152 R
(Continued)

FOREIGN PATENT DOCUMENTS

| DE | 4009358 A1 | 9/1991 |
| DE | 4227410 C1 | 11/1993 |

(Continued)

*Primary Examiner* — Angel R Estrada
(74) *Attorney, Agent, or Firm* — Laurence Greenberg; Werner Stemer; Ralph Locher

(57) ABSTRACT

A high-voltage bushing has an internal conductor and an insulating body which surrounds the internal conductor along its longitudinal direction. The internal conductor is routed out of the insulating body at a head end of the high-voltage bushing. A fastening flange is arranged on the insulating body at an end opposite the head end. An outer housing encloses the internal conductor and the insulating body from the fastening flange up to and including the head end in a moisture-tight manner. A high-voltage installation has a high-voltage conductor which is routed through a housing wall of the high-voltage installation by way of the novel high-voltage bushing.

11 Claims, 1 Drawing Sheet

(58) Field of Classification Search
CPC .......... F16L 5/02; F16L 5/00; B60R 16/0215; B60R 16/0207; B60R 16/0222
USPC .... 174/140 R, 142, 144, 650, 152 R, 11 BH, 174/14 BH, 31 R, 141 C; 16/2.1, 2.2
See application file for complete search history.

(56) References Cited

U.S. PATENT DOCUMENTS

| | | | |
|---|---|---|---|
| 3,055,968 A | 9/1962 | Spiece | |
| 3,548,070 A * | 12/1970 | Duenke | H02G 15/068 174/12 BH |
| 3,883,680 A * | 5/1975 | Keen, Jr. | H01B 17/34 174/12 BH |
| 4,401,841 A * | 8/1983 | Meyer | H01B 17/36 174/31 R |
| 4,500,745 A * | 2/1985 | Miggins | H01B 17/34 174/31 R |
| 4,563,545 A * | 1/1986 | Dzomba | H01B 17/301 174/152 R |
| 5,206,780 A * | 4/1993 | Varreng | H02G 15/06 361/117 |
| 8,492,656 B2 * | 7/2013 | Martinez | H01B 17/265 174/11 BH |
| 8,969,729 B2 * | 3/2015 | Jahnel | H01B 17/42 174/142 |
| 2002/0104679 A1 | 8/2002 | Krol et al. | |
| 2012/0292073 A1 | 11/2012 | Engels et al. | |

FOREIGN PATENT DOCUMENTS

| | | |
|---|---|---|
| DE | 69013191 T2 | 5/1995 |
| DE | 19945148 A1 | 3/2001 |
| DE | 60023477 T2 | 7/2006 |
| DE | 102005054641 B4 | 8/2008 |
| EP | 1170846 B2 | 1/2002 |
| WO | 2011086033 A1 | 7/2011 |

* cited by examiner

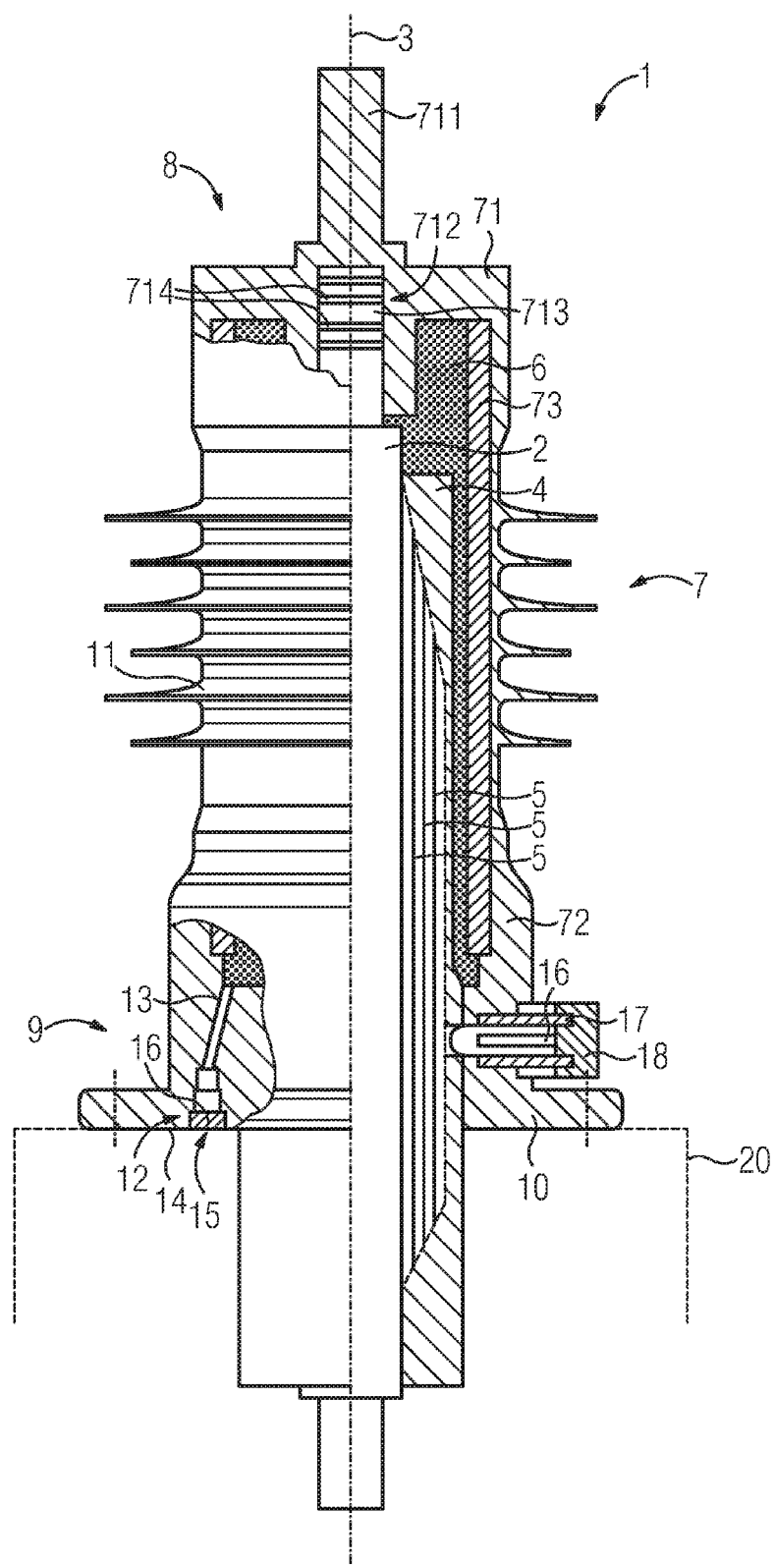

HIGH-VOLTAGE BUSHING AND HIGH-VOLTAGE INSTALLATION WITH THE BUSHING

CROSS-REFERENCE TO RELATED APPLICATION

This application claims the priority, under 35 U.S.C. § 119, of German patent application DE 10 2016 205 535.6, filed Apr. 4, 2016; the prior application is herewith incorporated by reference in its entirety.

BACKGROUND OF THE INVENTION

Field of the Invention

The invention relates to a high-voltage bushing comprising an internal conductor, an insulating body which surrounds the internal conductor along its longitudinal direction, wherein the internal conductor is routed out of the insulating body at a head end of the high-voltage bushing, a fastening flange which is arranged on the insulating body, and also an outer housing.

A high-voltage bushing of the generic kind is known, for example, from the commonly assigned published patent application US 2012/0292073 A1 and its counterpart international patent publication WO 2011/086033 A1. The object is to insulate a high-voltage line, which is at high-voltage potential, with a current-carrying current conductor from a surrounding area which is substantially at ground potential, for example a wall. The known high-voltage bushing is fastened to the wall of a transformer by way of the fastening flange. The internal conductor which is routed out of the insulating body is connected to a section of a high-voltage line. The insulating body provides insulation between the internal conductor and the wall. The insulation is required in order to avoid voltage flashovers.

In the known high-voltage bushings, the housing is sealed off by way of suitable sealing systems in order to protect against the ingress of moisture into the insulating body and against the harmful effects of external environmental influences. Seals, such as O-ring seals and/or flat seals, are used, in particular, at component junction points. Sealing systems of this kind are sometimes exposed to particularly severe environmental influences in the case of very long expected service lives of the high-voltage bushing of more than 25 years. In the event of long-term use, leaks which can reduce the operational capability of the high-voltage bushing can occur at these points.

SUMMARY OF THE INVENTION

It is accordingly an object of the invention to provide a high voltage bushing which overcomes the above-mentioned and other disadvantages of the heretofore-known devices and methods of this general type and which is more operationally reliable than the prior art high-voltage bushing.

With the foregoing and other objects in view there is provided, in accordance with the invention, a high-voltage bushing, comprising:
an internal conductor;
an insulating body surrounding the internal conductor along a longitudinal direction thereof, the internal conductor being routed out of the insulating body at a head end of the high-voltage bushing;
a fastening flange disposed on the insulating body; and
an outer housing enclosing the internal conductor and the insulating body from the fastening flange up to and including the head end in a moisture-tight manner.

In other words, the objects of the invention are achieved in that the housing encloses the internal conductor and the insulating body from the fastening flange up to and including the head end to form a complete moisture seal.

According to the invention, the high-voltage bushing is enclosed by the outer housing at the head-end side of the fastening flange. The insulating body and the internal conductor do not need to be additionally protected by the housing axially between the fastening flange and a foot end which is arranged opposite the head end because, in the mounted state, said insulating body and internal conductor are located within a housing wall of a high-voltage installation, for example a housing wall of a transformer. Therefore, this foot end-side part of the high-voltage bushing is adequately protected against external environmental influences by the housing wall.

The outer housing of the high-voltage bushing encloses, in particular, the internal conductor at the head end of the high-voltage bushing too. In this way, points, which are to be sealed, at a junction between the housing and the internal conductor, which is to be routed out of the insulating body, can be advantageously completely avoided. Dirt and moisture cannot pass into the interior to the insulating body. This can advantageously extend the service life of the high-voltage bushing and reduce the servicing costs. Particularly at operating sites where accessibility to the high-voltage bushing is restricted, such as in the offshore sector for example, a cost advantage can be achieved in this way by increasing the operational reliability of the high-voltage bushing.

It is considered to be particularly advantageous when all of the separate housing elements of the housing are connected to one another by means of adhesive bonding. In this way, screw connections between the individual housing elements can advantageously be dispensed with. The sealing apparatuses which are required in the case of screw connections or other mechanical connections are dispensed with in this case. The areal adhesive bonding ensures improved leaktightness. Particularly suitable adhesive bonding is considered to be adhesive bonding by shrink-fitting, which is known to a person skilled in the art, in this context. In a variant of the high-voltage bushing, adhesive bonding connections can be entirely dispensed with when the outer housing is of integral design.

According to one embodiment of the invention, the outer housing comprises a head fitting at the head end, a foot fitting on the fastening flange, and also a connecting pipe which connects the head fitting and the foot fitting. A particularly simple design of the housing, in the case of which only a few parts or housing elements suffice in order to provide the required protection of the high-voltage apparatus, is provided in this way. The connecting pipe can be inserted, for example, into a recess of corresponding dimensions in the foot fitting and a corresponding recess in the head fitting, so that the connecting points between the housing elements are designed to be as flat as possible. The foot fitting preferably forms one component with the fastening flange.

The head fitting is preferably composed of a metal. A particularly robust housing element which can additionally carry current is provided in this way.

According to a preferred embodiment of the invention, the head fitting has outer current contact means which are integrated into the housing. The outer current contact means serve to establish an electrical connection between the head fitting or the internal conductor and a high-voltage conductor. The outer current contact means enable separate sealing of the housing of the high-voltage bushing at a direct contact point between the internal conductor and the high-voltage conductor to be dispensed with. In the simplest case, the outer current contact means consist of a rod which is composed of electrically conductive material. As an alternative, a thread which is formed on the outer housing can be provided. Accordingly, means for establishing a screw connection with the thread are to be provided on the high-voltage conductor which is to be connected.

The head fitting preferably has inner current contact means which are integrated into the housing. The inner current contact means serve to establish an electrical connection between the head fitting and the internal conductor. By way of example, the inner current contact means can comprise contact fins which are arranged on an inner face of an inner recess in the head fitting. In this case, the inner recess is designed to receive that section of the internal conductor which is routed out of the insulating body.

If both the inner and the outer current contact means are provided on the head fitting, the electrical connection between the internal conductor and the high-voltage conductor which is to be connected is established entirely by means of the head fitting. It is therefore not necessary to route the internal conductor out of the outer housing.

The connecting pipe is preferably composed of a glass fiber-reinforced plastic. This material is considered to be particularly robust.

According to a preferred embodiment of the invention, a secondary insulation is provided between the housing and the insulating body, and the high-voltage bushing comprises a device for filling the secondary insulation, wherein the device has a filling channel which runs at least partially in the fastening flange and opens to a side, which is averted from the housing, such that it can be closed. The secondary insulation serves to further insulate the internal conductor and to further seal off an intermediate space between the insulating body and the outer housing. After assembly of the high-voltage bushing, the secondary insulation is filled into the intermediate space through the filling channel. The need for complicated seals at the filling channel can be avoided by arranging an opening of the filling channel to that side which is averted from the outer housing. The opening of the filling channel is located on that side which faces the housing wall of the high-voltage installation and is protected by said housing wall.

The secondary insulation preferably comprises a polyurethane foam. The polyurethane foam is a dry foam which has particularly good insulating properties. According to known methods, the polyurethane foam is foamed with a gas, for example SF6 (sulfur hexafluoride) or nitrogen, and then filled into the intermediate space.

According to a further embodiment of the invention, the high-voltage bushing comprises a measurement connection for potential measurement, wherein the measurement connection is enclosed by the housing in a moisture-tight manner. The potential measurement serves to monitor the state of the high-voltage bushing. To this end, a measurement device for measuring current and/or voltage is connected to the measurement connection. The outer housing preferably comprises a measurement output fitting which encloses the measurement connection and which is connected to the other housing elements of the housing in a moisture-tight manner, for example by means of adhesive bonding.

The insulating body suitably comprises electrically conductive control inserts, which are spaced apart from one another by insulating layers which are composed of resin-impregnated paper, for field control. An insulating body which is designed in this way forms a compact block. Oil insulation is no longer required in this high-voltage bushing. As an alternative, the insulating body can comprise insulating layers which are composed of resin-impregnated synthetics (RIS). The synthetic material is not sensitive to moisture.

The invention further relates to a high-voltage installation comprising a high-voltage conductor which is routed through a housing wall of the high-voltage installation by means of a high-voltage bushing.

High-voltage installations of this kind are known from the prior art. By way of example, transformers and gas-insulated switchgear assemblies have housing walls, so that the high-voltage conductors of these high-voltage installations have to be routed through the housing walls by means of high-voltage bushings in order to avoid electrical flashovers and to ensure adequate insulation.

The object of the present invention is that of proposing a high-voltage installation of this kind which is as operationally reliable as possible.

In the case of a high-voltage installation of this kind, the object is achieved in that the high-voltage bushing is a high-voltage bushing according to the invention.

The advantages of the high-voltage installation according to the invention can be found in the advantages described above in connection with the high-voltage bushing according to the invention.

According to one embodiment of the invention, the high-voltage bushing is pluggable. To this end, the high-voltage installation can comprise a bushing plug socket. The bushing plug socket is part of the housing of the high-voltage installation, and therefore the housing is closed off such that it forms a seal for the insulating means. The pluggable high-voltage bushing has a plug-in section for being plugged into the bushing plug socket. By way of example, the pluggable high-voltage bushing can be inserted or can be plugged into the bushing plug socket by way of part of one end of the high-voltage bushing, which end tapers in the direction of one end of the high-voltage bushing. In this case, an electrical connection is established in a simple and reliable manner between the internal conductor of the high-voltage bushing and an electrical conductor which is connected to the bushing plug socket. At the same time, the pluggable high-voltage bushing ensures, in interaction with the bushing plug socket, sufficient dielectric strength in the region of the boundary areas between the high-voltage bushing and the bushing plug socket.

According to a preferred refinement, the plug-in section of the high-voltage bushing is sheathed by a viscous insulator, wherein a high-voltage conductor extends through the viscous insulator or, in other words, the sheath at the free end of the plug-in section. The viscous insulator or insulator of high viscosity ensures, as the outer sheath, adequate electrical insulation between the insulating and dimensionally stable solids of the bushing plug socket and the plug-in section which bear against one another. The insulator is expediently a pasty lubricating substance with flow properties. Owing to the flow properties, the viscous insulator is pressed into the joint between the plug-in section of the high-voltage bushing and the receiving section of the bushing plug socket and completely fills said joint. In order to receive the possibly excessively liquid viscous insulator, the receiving section has a sufficiently large auxiliary volume with clearances into which the viscous insulator can be pressed. Air pockets between the plug-in section and the receiving section with resulting high electrical field strengths can be avoided in this way.

Other features which are considered as characteristic for the invention are set forth in the appended claims.

Although the invention is illustrated and described herein as embodied in a high-voltage bushing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE is a schematic illustration of an exemplary embodiment of a high-voltage bushing according to the invention.

DETAILED DESCRIPTION OF THE INVENTION

Referring now to the sole FIGURE of the drawing in detail, there is shown a high-voltage bushing 1 comprising an internal conductor 2 which extends along a longitudinal axis 3 of the high-voltage bushing 1. The internal conductor 2 is surrounded by an insulating body 4. The insulating body 4 comprises control inserts 5 for capacitively controlling the high-voltage bushing 1. The control inserts are separated from one another by insulating layers which are composed of resin-impregnated paper or a synthetic nonwoven.

The high-voltage bushing 1 further comprises a secondary insulation 6 which is composed of dry foam. The secondary insulation 6 fills an intermediate space between the insulating body 4 and an outer housing 7.

The outer housing 7 comprises a head fitting 71 at a head end 8 of the high-voltage bushing 1, a foot fitting 72 at a foot end 9, and also a connecting pipe 73. The connecting pipe 73 is composed of a glass fiber-reinforced plastic.

The high-voltage bushing 1 comprises a fastening flange 10 in order to fasten the high-voltage bushing 1 to a wall of a high-voltage installation 20. The fastening flange 10 forms a unit with the foot fitting 72 in the exemplary embodiment illustrated in the FIGURE.

Further insulation elements 11 which are composed of silicone are fitted to the outer housing 7.

The head fitting 71, which is composed of metal, encloses the insulating body 4, together with the internal conductor 2, in the region of the head end 8. The head fitting 71 comprises outer current contact means 711 for establishing an electrical connection with a high-voltage conductor (not illustrated). Furthermore, the head fitting 71 comprises inner current contact means 712 for connecting the internal conductor 2 to the head fitting 71. The inner current contact means 712 comprise an inner recess 713, which is dimensioned to receive the internal conductor, and also contact fins 714.

The foot fitting 72 comprises a device 12 for filling the secondary insulation. The device 12 has a filling channel 13. The filling channel 13 runs between the intermediate space, which is to be filled, between the insulating body 4 and the housing 7 and that side 14 of the fastening flange 10 which faces away from the head end 8. If the high-voltage bushing 1 is mounted on the wall of the high-voltage installation 20, the opening 15 of the filling channel is concealed by the wall. The opening 15 is additionally closed by a seal 16.

The foot fitting 72 furthermore comprises a lateral bore for a potential output with a measurement connection 16 for potential measurement. The measurement connection 16 is enclosed by a lateral pipe 17 which is composed of glass fiber-reinforced plastic and a hood 18 which is composed of metal. The hood 18 contains an inner and an outer connection for connecting the measurement connection 16 to a separate measuring apparatus (not illustrated) or a fixed potential.

The head fitting 71, the foot fitting 72, the connecting pipe 73, the lateral pipe 17 and the hood 18 are connected to one another in a sealed manner by means of adhesive bonding. That is, a suitable adhesive or glue is used to connect the various elements constituting the outer housing to one another so as to provide a moisture-sealed housing. The connecting pipe 73 and the lateral pipe 17 are additionally siliconized, that is to say provided with a silicone coating, at their points which are accessible from the outside.

The invention claimed is:

1. A high-voltage bushing, comprising:
   an internal conductor;
   a head end;
   an insulating body surrounding said internal conductor along a longitudinal direction thereof, said internal conductor being routed out of said insulating body at said head end of the high-voltage bushing;
   a fastening flange disposed on said insulating body;
   an outer housing enclosing said internal conductor and said insulating body from said fastening flange up to and including said head end in a moisture-tight manner; and
   a secondary insulation of polyurethane foam disposed between said housing and said insulating body;
   said high-voltage bushing including a device for filling said polyurethane foam of said secondary insulation, said device having a closable filling channel which runs at least partially in said fastening flange and opens to a side averted from said housing.

2. The high-voltage bushing according to claim 1, wherein said outer housing is formed of a plurality of separate housing elements and all of said separate housing elements of said housing are connected to one another by adhesive bonding.

3. The high-voltage bushing according to claim 2, wherein said housing comprises a head fitting at said head end, a foot fitting on said fastening flange, and a connecting pipe connecting said head fitting with said foot fitting.

4. The high-voltage bushing according to claim 3, wherein said head fitting is composed of a metal, and said head fitting includes an outer current contact and an inner current contact integrated into said housing.

5. The high-voltage bushing according to claim 3, wherein said head fitting is composed of a metal.

6. The high-voltage bushing according to claim 3, wherein said head fitting includes an outer current contact integrated into said housing.

7. The high-voltage bushing according to claim 3, wherein said head fitting includes an inner current contact integrated into said housing.

8. The high-voltage bushing according to claim 3, wherein said connecting pipe is composed of a glass fiber-reinforced plastic.

9. The high-voltage bushing according to claim 1, wherein said high-voltage bushing comprises a measurement connection for potential measurement, and said measurement connection is enclosed by said housing in a moisture-tight manner.

10. The high-voltage bushing according to claim 1, wherein said insulating body comprises electrically conductive control inserts for field control and insulating layers of resin-impregnated paper disposed to space said control inserts apart from one another.

11. A high-voltage installation, comprising: a housing and a high-voltage conductor routed through a housing wall of the housing of the high-voltage installation by way of a high-voltage bushing according to claim 1.

* * * * *